May 9, 1961 W. B. HERNDON ET AL 2,983,164
ACCESSORY DRIVE TRANSMISSIONS
Filed June 28, 1957 3 Sheets-Sheet 1
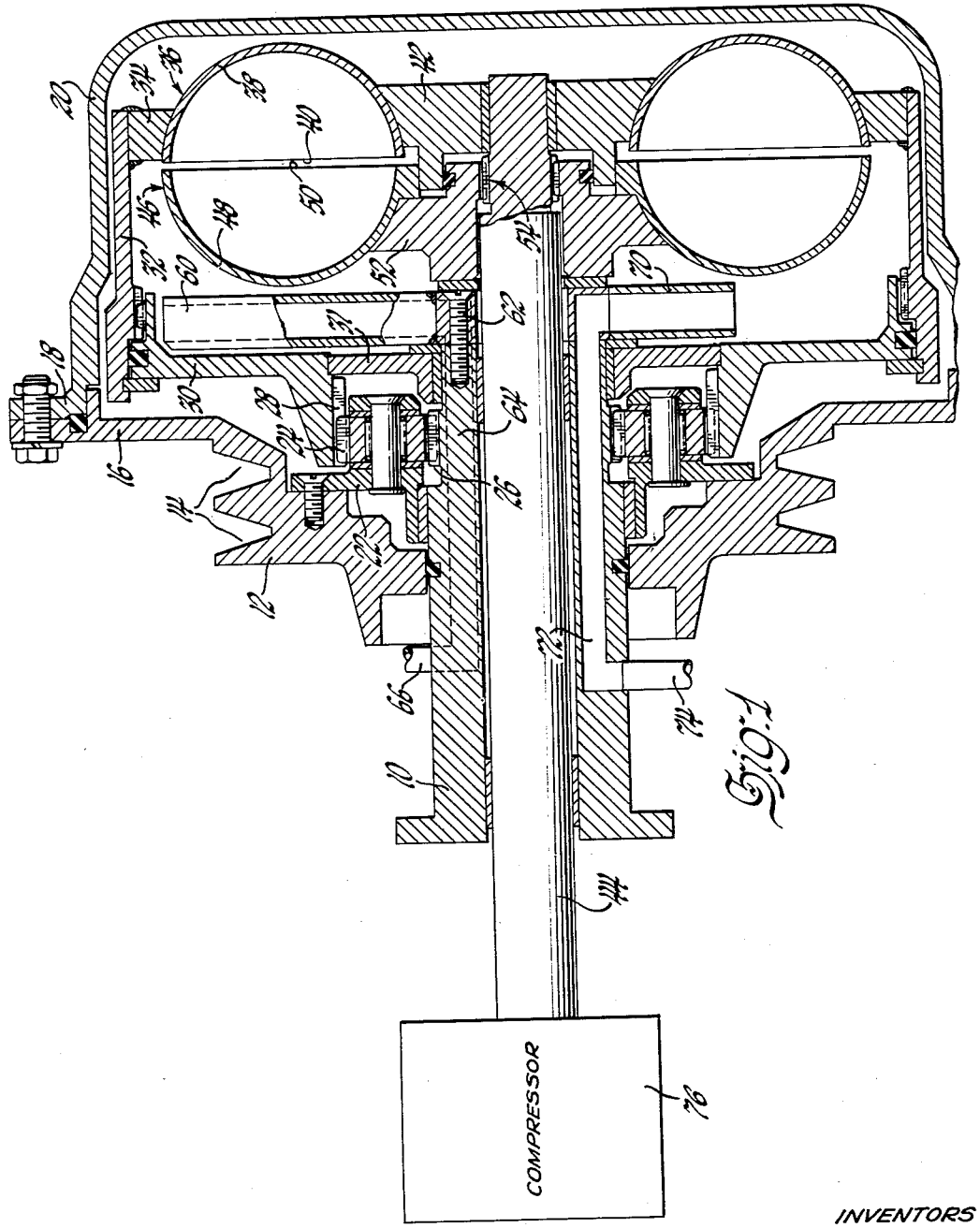
INVENTORS
Walter B. Herndon, &
Victor C. Moore
BY
W. C. Middleton
ATTORNEY

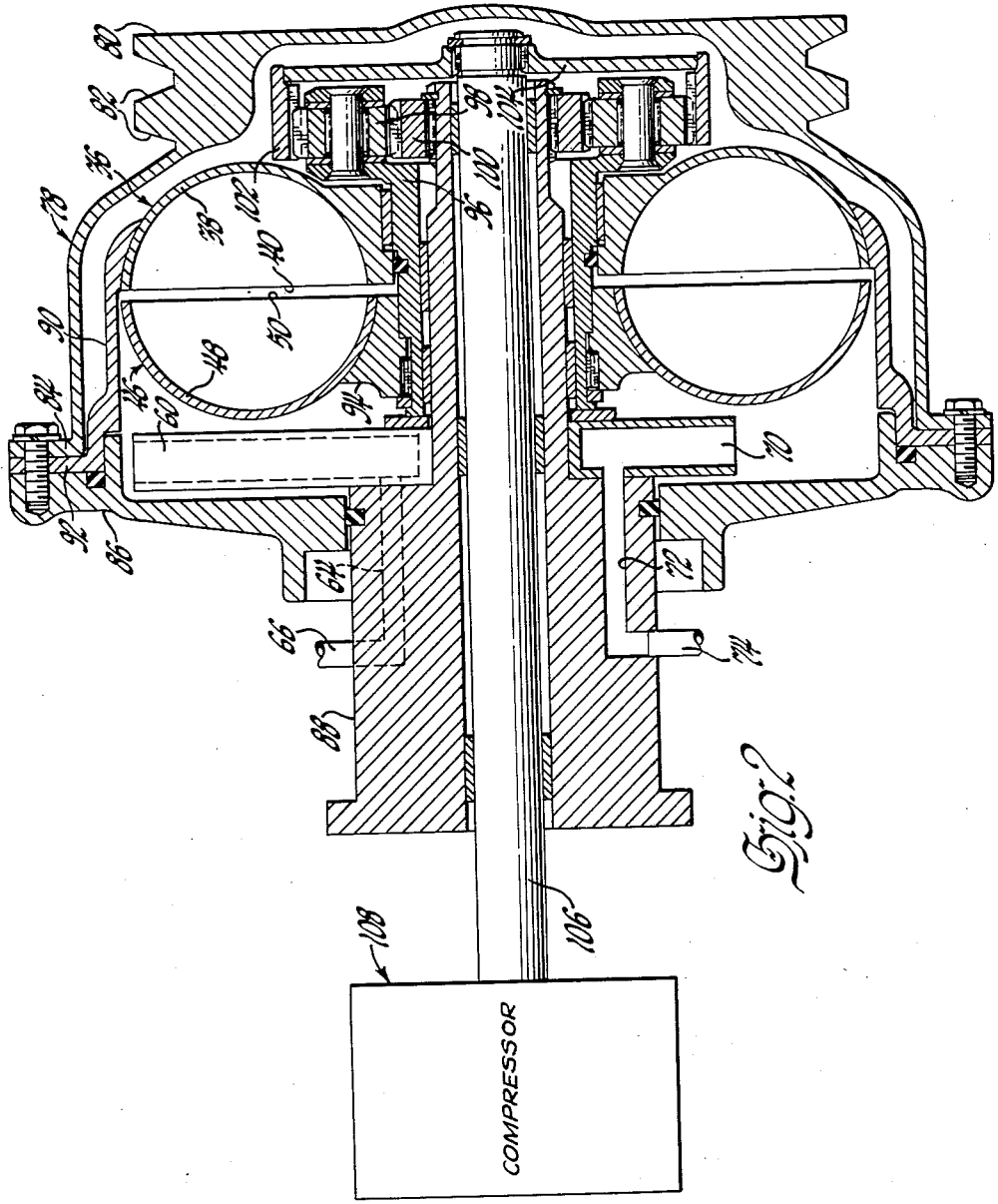

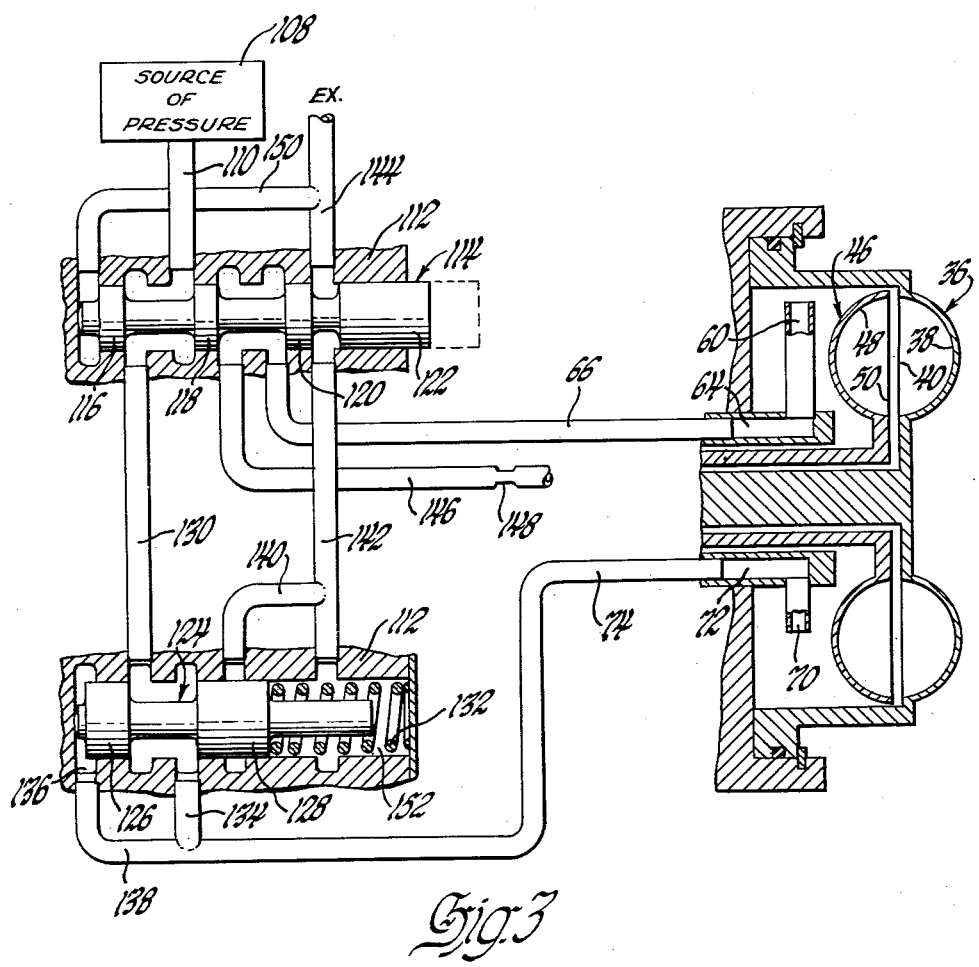

United States Patent Office 2,983,164
Patented May 9, 1961

2,983,164

ACCESSORY DRIVE TRANSMISSIONS

Walter B. Herndon, Ann Arbor, and Victor C. Moore, Plymouth, Mich., assignors to General Motors Corporation, Detroit, Mich., a corporation of Delaware Filed June 28, 1957, Ser. No. 668,744

18 Claims. (Cl. 74—731)

This invention relates to accessory drive transmissions and more particularly to such transmissions providing automatic control of the speed of the accessory or accessories driven thereby.

In connection with the operation of automotive vehicles certain accessories are conventionally driven by the engine of the vehicle, such accessories being in the nature of generators, fans, oil pumps for power operated mechanisms and compressors for air conditioning systems. Some of these accessories operate at best efficiency of the speed of the drive thereof is maintained as nearly constant as is possible. However, the maintenance of substantially constant speed drive is very difficult due to the wide variation in the speed of engine operation.

An object of the present invention is to provide an accessory drive transmission of such character that the output speed thereof can be automatically limited to a predetermined maximum.

Another object of the invention is to provide a drive transmission of the foregoing character in which the output speed thereof can be increased relative to the input speed while limiting the maximum output speed.

Another object of the invention is to provide an accessory drive transmission incorporating a fluid coupling with automatic controls therefor of such character that the slippage in the coupling between driving and driven elements is automatically increased as the speed of rotation of the driving element is increased beyond a predetermined maximum.

A further object of the invention is to provide a transmission incorporating a coupling in which the fluid in the working circuit of the coupling is automatically controlled so that with increase in driving element speed beyond a predetermined speed the liquid contents of the coupling are automatically reduced to increase coupling slippage.

A further object of the invention is to provide a transmission as previously described in which the coupling driving element is overdriven relative to the input of the transmission so that at low input speeds of the transmission the output speed will be at a higher rate than the input speed with minimum slippage in the coupling.

A further object of the invention is to provide as a modification a transmission wherein an overdrive arrangement is included between the driven element of the coupling and the output shaft for increasing the speed of rotation of the output shaft relative to the input shaft when the coupling is operating with maximum efficiency.

In carrying out the foregoing and other objects of the invention several forms of transmissions embodying the same general control principle can be utilized. Basically the invention relates to the automatic control of the slipping characteristics of a fluid coupling in such fashion that the speed of rotation of the driven element thereof does not materially increase with speed of rotation of the driving element beyond a predetermined range or maximum driving element speed. The transmission is particularly adaptable for use in conjunction with automotive vehicles having power plants such as engines therein. The input of the transmission can be driven at any desired ratio by the engine through the agency of pulleys or other well known torque transmitting mechanisms. The input of the transmission is connected to drive the driving element of a fluid coupling and this coupling has the driven element thereof connected to the output shaft of the transmission which output shaft can be connected directly to an accessory such as an air conditioner compressor or can be connected to drive any of the well known accessories employed in automotive vehicles. In the simplest form of the invention it is contemplated that the input of the transmission can be driven at a speed greater than that of the crankshaft of the engine. The fluid coupling is supplied with fluid, such as oil, from any convenient source of pressure through a manually controlled valve and an automatically operating pressure regulating valve. If the coupling is substantially completely filled with oil, drive of the driving element thereof will cause drive of the driven element thereof at a speed approaching that of the driving element as determined by the inherent slipping characteristics of the coupling. Consequently, if the input of the transmission is being driven at an overdrive ratio relative to the engine the output of the transmission will also be at an overdrive ratio. Such overdrive relation will continue until the speed of rotation of the driving element of the coupling creates a static pressure within the enclosing shroud of the coupling, which static pressure is high enough to cause the automatic pressure regulating valve to become operative. When this occurs the quantity of oil in the coupling is reduced thereby increasing the slipping between the driving and driven elements thereof.

In addition to the basic form of invention, modifications thereof can be employed in the nature of an overdrive gear arrangement between the input of the transmission and the driving element of the coupling. Due to this arrangement it will be evident that with the coupling filled the output speed of the transmission will be in excess of the input speed thereof, thereby serving the same purpose as an overdrive arrangement between the engine and the transmission input. The automatic relation of slippage in the coupling is accomplished in the same fashion as in the basic arrangement. In another form of the invention embodying the principles set forth hereinbefore, an ovedrive gear arrangement is provided between the the driven coupling element and the driven transmission shaft to complete an initial overdrive of the transmission output shaft at low engine speeds with a reduction in this overdrive ratio automatically accomplished when the coupling driving element exceeds a predetermined maximum speed of rotation.

Other features, objects and advantages of the invention will become apparent by reference to the following detailed description of the accompanying drawing wherein:

Figure 1 is a view partially in vertical section of one form of the invention employing an overdrive arrangement between the transmission input and the driving element of the coupling.

Figure 2 is a similar view of a modification of the invention employing an overdrive arrangement between the driven element of the coupling and the output shaft of the transmission, and Figure 3 is a schematic circuit diagram of a transmission embodying the principles of the invention with the hydraulic controls therefor.

Referring to the drawings and particularly to Figure 1, 10 indicates a support member for the transmission, which support member is in the nature of a sleeve adapted to be attached to any suitable supporting structure such as the engine of a motor vehicle or the like. Rotatable about the stationary sleeve 10 is a pulley member 12 having grooves 14 therein for the reception of the usual drive belts. The member 12 has a radial disk extension 16 to which is bolted, or otherwise secured, the flange 18 of a cup-shaped housing member 20. The member 12 with its disk 16 and housing 20 serve to enclose a fluid coupling to be described later.

Fastened to the pulley 12 is the carrier 22 of a planetary gear set. This carrier has rotatably mounted thereon a plurality of planet pinions 24 which mesh with a sun gear 26 formed integrally with or otherwise secured to the stationary support 10. Also meshing with the planet pinions 24 is a ring gear 28 which has a radial disk portion 30 which can be splined or otherwise secured to a drum 32 connected by the member 34 to drive the pump 36 of the fluid coupling. The pump 36 as illustrated has an outer shroud 38 and blades 40. The hub 42 of the pump is rotatably supported on the output shaft 44 of the transmission. The turbine 46 of the coupling has a shroud 48 and blades 50. The hub 52 of the turbine is splined to the output shaft 44 as indicated at 54. As will be apparent from the drawings, the turbine 46 is spaced some distance axially from the disk extension 30 and its attached part 31 of the ring gear so that the drum 32, the disk 30 and its attached part 31, serve as a rotating shroud to define a reservoir chamber for fluid which may be forced from the working circuit of the coupling during rotation thereof.

One or more tubes 60 are secured within the shroud of the coupling with the inner end thereof secured as by screws 62 to the stationary sleeve 10. The upper ends of the tubes 60 are open and may have any desired slope thereto as may be advantageous in the required operation thereof. The interior of the tubes 60 are in communication with channels 64 in the support 10 and channels 64 in turn communicate with a liquid conduit 66. Also located within the shroud of the coupling are one or more short tubes 70 secured to the end of the support 10 and arranged so that the interior of each tube 70 is in communication with one or more channels 72 in member 10, and the channels 72 are connected to a liquid conduit 74.

The drive train through this Figure 1 transmission is as follows: Drive from a power source, e.g., a vehicle engine crank shaft (not shown) is transferred by the pulley member 12 to the carrier 22 and then, since the sun gear 26 is held by the stationary sleeve 10, by the ring gear 28 at an increased speed relative to the carrier, i.e., the ring gear will be overdriven, through the drum 32 and member 34 to the fluid coupling pump 36. When fluid is supplied to the fluid coupling in a manner to be described, drive will be transmitted between the pump 36 and the turbine 46 by circulated fluid through hub 52 to the output shaft 44. The output shaft 44 is illustrated connected to a compressor indicated generally at 76, but, as mentioned, may drive any of the well known vehicle accessories, either separately or jointly.

A modification of the Figure 1 transmission is demonstrated by Figure 2 in which the components have been rearranged. In this modified transmission, a housing 78 with an integral or otherwise attached pulley member 80 including a series of belt grooves 82 has a flanged portion 84 bolted or otherwise secured to a radial disk 86. The radial disk 86 and the housing 78 are rotatably supported on a stationary sleeve 88, similar to the sleeve 10 in Figure 1, and together define a fluid right enclosure for the fluid coupling.

For demonstration purposes the fluid coupling utilized in this Figure 2 embodiment is identical with that in Figure 1, although different sizes and shapes may be employed as desired. The pump 36 has a drum extension 90 which terminates in a radial flange 92. Flange 92 is clampingly interposed between the radial disk 86 and the flange portion 84 of the housing 78 so as to rotate therewith. The turbine 46 of the coupling includes a hub 94 which is attached to the carrier 96 of a planetary gear set. A series of planet pinions 98 are journaled on the carrier 96 and intermesh with a sun gear 100 secured to the stationary sleeve 88 and a ring gear 102. The ring gear 102 is connected by a radially extending member 104 to the output shaft 106 which, in turn, is connected in drive relation with an accessory such as the compressor 108.

A rotating shroud like that in Figure 1, which functions as a reservoir chamber, is formed next to the turbine 46 by the disk 86 and the drum extension 90 of the pump 36. Within this shroud the tubes 60 and 70 of Figure 1 are connected, respectively, to liquid conduits 66 and 74 by channels 64 and 72 in the Figure 1 manner.

In operation of this Figure 2 modification, drive is transferred from the power source to the pulley member 80 and then by the housing 78 to the pump 36 of the fluid coupling. Assuming that fluid is being supplied to the coupling in a manner to be explained, drive will be transferred from the pump 36 by the circulated fluid to the turbine 46 and on to the carrier 96. With the sun gear held stationary, the ring gear 102 will be overdriven relative to the carrier and, therefore, drive will be transferred at an increased speed to the output shaft 106.

In both the Figures 1 and 2 transmissions, an overdriving gear set has been utilized to enable drive of the vehicle accessories to be at a speed faster than that of the engine at idle, a desirable feature when the accessories require speeds greater than engine idling speed to operate efficiently. In some other applications, this overdriving aspect may not be desired and, hence, the gear set can be eliminated. Also, an underdrive may be obtained by interchanging the input and output of the planetary gear set in a way well known.

In Figure 3, a control system is depicted which is applicable to either the Figure 1 or 2 transmissions. Pressure fluid for the system is supplied by a suitable source, indicated generally at 108, through a supply conduit 110 to a valve body 112. Slidable in separate bores in the valve body 112 are a control valve 114 comprising a series of spaced lands 116, 118, 120 and 122 and a pressure regulating valve 124 having spaced lands 126 and 128. The control valve 114 is moved by a suitable agency either manually or automatically from an operative position shown to an inoperative position represented by the dotted lines while the valve 124 regulates pressure automatically.

Assuming the valve 114 is in the operative position, communication is permitted by the lands 116 and 118 between a port connected to the line 110 from the source 108 and a port connected to a line 130 to the pressure regulating valve 124.

As a result, pressure fluid is supplied by the source 108 to the pressure regulating valve 124 where, with the valve biased by a spring 132 to the non-regulating position demonstrated, it is transferred between the lands 126 and 128 through a branch line 134, the conduit 74, channels 72 and the tubes 70 to the coupling. At the same time, this same fluid pressure is supplied to a control chamber 136 at the front of the land 126 by another branch line 138. As this fluid pressure builds up, the force exerted by the pressure in the control chamber 136 on the land 126 will move the valve 124 in opposition to the spring 132 to the right restricting the port connected to the line 130. With a continued pressure rise, the port connected to the line 130 will be cut off by the land 126 and the land 128 will open a port connected to a line 140. Since the line 140 is connected to a line 142 and since the control valve 114 is positioned to establish communication between lands 120 and 122 of line 142 with an exhaust line 144, the pressure of the fluid in the branch line 134, conduit 74 and control chamber 136 will be reduced sufficiently for the spring 132 to move the valve 124 to the left and reopen the port connected to the line 130. This conventional regulating action of the valve 124 will, until the fluid coupling starts operation, develop a pressure proportional to the opposing force of the spring 132.

After sufficient pressure fluid is supplied to the fluid coupling via the conduit 74 and the tubes 70, it will be circulated between the pump 36 and the turbine 46 in the usual manner to commence drive of the turbine. Initially, the speed of the turbine 46 will be considerably less than that of the pump 36 due to slippage therebetween, but, as the quantity of fluid in the coupling working circuit increases, slippage will be reduced and the speed of the turbine 46 may, if wanted, approach that of the pump 36. With increased coupling speed, centrifugal force will cause fluid to be ejected from the coupling working circuit which fluid will form an annular ring along the inside of the rotating shroud in the vicinity of the tubes 60 and 70. A part of this fluid will be picked by the tubes 60 and proceed through channels 64, conduit 66 between lands 118 and 120, through a line 146 and a restriction 148 to lubricating channels throughout the transmission. The function of the restriction 148 is to limit the rate of discharge from the line 146 to a predetermined maximum which is preferably ample for cooling purposes. As the annular ring of fluid develops, the tubes 70 become effective and because of their arrangement sense changes in the static pressure of the rotating fluid. If the speed of rotation of the coupling is such that the static pressure becomes greater than the pressure of the fluid being supplied from the pressure regulating valve 124, a back pressure will be created in the tubes 70 and eventually extend through channels 72, conduit 74, lines 134 and 138 to the control chamber 136. This back pressure in the control chamber 136 will interrupt pressure regulation by moving the valve 124 to the right so that the land 126 will close the port connected to the inlet line 130 and the land 128 will open the port connected to the outlet line 134 to exhaust through the lines 140, 142 and 144. Fluid will continue to drain from the coupling out tubes 60 but none will be supplied to the tubes 70 until the back pressure is reduced sufficiently for the spring 132 to move the valve 124 to the left and re-establish communication between the lines 130 and 134. This cycle of events will be repeated to automatically control the flow of fluid through the coupling. Consequently, since static pressure, which is reflective of speed, is utilized to limit the quantity of fluid within the coupling working circuit and accordingly to control the slippage between the turbine 46 and pump 36, the speed of the turbine 46 can not exceed a predetermined maximum.

To stop operation of the coupling, the valve 114 is moved to the right whereupon the lands 118 and 120 permit rapid egress of fluid from the coupling through tubes 60, channels 64, conduit 66 out the exhaust line 144. The exhaust line 144 through a branch 150 also drains at all times the area in front of the control valve land 116 as well as the regulating valve spring pocket 152 through the line 142 of any leakage fluid that might interfere with the free operation of either of the valves 114 and 124.

We claim:

1. In a transmission, an input, an output, a hydrodynamic drive device comprising driving and driven elements cooperating to define a fluid working circuit therebetween, gearing interconnecting the input and the driving element of the hydrodynamic drive device, the driven element being connected to the output, a fluid inlet and a fluid outlet for the hydrodynamic drive device, and means sensing the speed of one of the elements, the sensing means being operative to alter fluid flow between the inlet and outlet in accordance with variations in the speed of the device so as to control the quantity of fluid within the working circuit and accordingly maintain the speed of the driven element relatively constant.

2. In a transmission, an input, an output, a hydrodynamic drive device comprising driving and driven elements cooperating to define a fluid working circuit therebetween, the driving element being connected to the input, gearing interconnecting the driven element of the hydrodynamic drive device and the output, a fluid inlet and a fluid outlet for the hydrodynamic drive device, and means sensing the speed of one of the elements, the sensing means being operative to alter fluid flow between the inlet and outlet in accordance with variations in the speed of the device so as to control the quantity of fluid within the working circuit and accordingly maintain the speed of the driven element relatively constant.

3. In a transmission, an input, an output, a hydrodynamic drive device comprising driving and driven elements cooperating to define a fluid working circuit therebetween, planetary gearing for overdriving the driving element of the hydrodynamic drive device relative to the input, the driven element being connected to the output, a fluid inlet and a fluid outlet for the hydrodynamic drive device, and means sensing the speed of one of the elements, the sensing means being operative to alter fluid flow between the inlet and outlet in accordance with variations in the speed of the device so as to control the quantity of fluid within the working circuit and accordingly maintain the speed of the driven element relatively constant.

4. In a transmission, an input, an output, a hydrodynamic drive device comprising driving and driven elements cooperating to define a fluid working circuit therebetween, the driving element being connected to the input, planetary gearing for overdriving the output relative to the driven element of the hydrodynamic drive device, a fluid inlet and a fluid outlet for the hydrodynamic drive device, and means sensing the speed of one of the elements, the sensing means being operative to alter fluid flow between the inlet and outlet in accordance with variations in the speed of the device so as to control the quantity of fluid within the working circuit and accordingly maintain the speed of the driven element relatively constant.

5. In a transmission, an input, an output, a hydrodynamic drive device comprising driving and driven elements cooperating to define a fluid working circuit therebetween, planetary gearing including sun and ring gear members, a planet carrier member, planet pinions journalled on the carrier and in engagement with the sun and ring gear members, one of the members being connected to the input, another to the driving element of the hydrodynamic drive device and still another functioning as a reaction member, the driven element being connected to the output, a reservoir chamber rotatable within one of the elements, a fluid inlet and a fluid outlet for the hydrodynamic drive device both positioned within the reservoir chamber, the fluid inlet having the outlet thereof so arranged as to communicate with a speed sensitive pressure within the chamber, and means responsive to the speed sensitive pressure and automatically operative to alter fluid flow between the inlet and outlet so as to limit the quantity of fluid in the working circuit and thereby confine the speed of the driven element to a predetermined maximum.

6. In a transmission, an input, an output, a hydrodynamic drive device comprising driving and driven elements cooperating to define a fluid working circuit therebetween, the driving element being connected to the input, planetary gearing including sun and ring gear members, a planet carrier member, planet pinions journalled on the carrier and in engagement with the sun and ring gear members, one of the members being connected to the driven element of the hydrodynamic drive device, another to the output and still another functioning as a reaction member, a reservoir chamber rotatable with one of the elements, a fluid inlet and a fluid outlet for the hydrodynamic drive device both positioned within the reservoir chamber, the fluid inlet having the outlet thereof so arranged as to communicate with a speed sensitive pressure within the chamber, and means responsive to the speed sensitive pressure and automatically operative to alter the fluid flow between the inlet and outlet so as to limit the quantity of the fluid in the working circuit and thereby confine the speed of the driven element to a predetermined maximum.

7. In a transmission, an input, an output, a hydrodynamic drive device comprising a driving and driven elements cooperating to define a fluid working circuit therebetween, planetary gearing for overdriving the driving element relative to the input including a stationary sun gear, a ring gear connected to the driving element of the hydrodynamic drive device, a planet carrier connected to the input and planet pinions journalled on the carrier and in engagement with the sun and ring gears, the driven element being connected to the output, a reservoid chamber rotatable with one of the elements, a fluid inlet and a fluid outlet for the hydrodynamic drive device both positioned within the reservoir chamber, the fluid inlet having the outlet thereof so arranged as to communicate with a speed sensitive pressure within the chamber, a source of fluid pressure connected to the fluid inlet, and a pressure regulating valve automatically operative to control the pressure within the reservoir chamber in response to the speed sensitive pressure and govern fluid flow between the inlet and outlet so as to limit the quantity of fluid in the working circuit and thereby confine the speed of the driven element to a predetermined maximum.

8. In a transmission, an input, an output, a hydrodynamic drive device comprising driving and driven elements cooperating to define a fluid working circuit therebetween, the driving element being connected to the input, planetary gearing for overdriving the output relative to the driven element including a stationary sun gear, a ring gear connected to the output, a planet carrier connected to the driven element of the hydrodynamic drive device and planet pinions journalled on the carrier and in engagement with the sun and ring gears, a reservoir chamber rotatable with one of the elements, a fluid inlet and a fluid outlet for the hydrodynamic drive device both positioned within the reservoir chamber, the fluid inlet having the outlet thereof so arranged as to communicate with a speed sensitive pressure within the chamber, a source of fluid pressure connected to the fluid inlet, and a pressure regulating valve automatically operative to control the pressure within the reservoir chamber in response to the speed sensitive pressure and govern fluid flow between the inlet and outlet so as to limit the quantity of fluid in the working circuit and thereby confine the speed of the driven element to a predetermined maximum.

9. In a transmission, an input, an output, a fluid coupling comprising pump and turbine elements cooperating to define a fluid working circuit therebetween, planetary gearing for overdriving the pump element relative to the input including a stationary sun gear, a ring gear connected to the pump element of the fluid coupling, a planet carrier connected to the input, and planet pinions journalled on the carrier and in engagement with the sun and ring gears, the turbine element being connected to the output, a reservoir chamber rotatable with one of the elements, stationary fluid inlet and outlet tubes positioned within the reservoir chamber, the inlet tube having the outlet thereof so arranged as to communicate with a speed sensitive pressure within the chamber, a source of fluid pressure connected to the fluid inlet tube, a control valve in a first position both interrupting supply of fluid pressure to the inlet tube and draining fluid pressure from the outlet tube and in a second position both supplying fluid pressure to the inlet tube and limiting the draining of fluid pressure from the outlet tube to a predetermined maximum rate, and a pressure regulating valve automatically operative to control in response to the speed sensitive pressure within the reservoir chamber fluid flow between the inlet and outlet tubes so as to limit the quantity of fluid in the working circuit and thereby confine the speed of the turbine element to a predetermined maximum.

10. In a transmission, an input, an output, a fluid coupling comprising pump and turbine elements cooperating to define a fluid working circuit therebetween, the pump element being connected to the input, planetary gearing for overdriving the output relative to the turbine element including a stationary sun gear, a ring gear connected to the output, a planet carrier connected to the turbine element and planet pinions journalled on the carrier and in meshing relation with the sun and ring gears, a reservoir chamber rotatable with one of the elements, stationary fluid and inlet and outlet tubes stationed within the reservoir chamber, the inlet tube having the outlet thereof so arranged as to communicate with a speed sensitive pressure within the chamber, a source of fluid pressure connected to the fluid inlet tube, a control valve in a first position both interrupting supply of fluid pressure to the inlet tube and draining fluid pressure from the outlet tube and in a second position both supplying fluid pressure to the inlet tube and limiting the draining of pressure fluid from the outlet tube to a predetermined maximum rate, and a pressure regulating valve automatically operative when the control valve is in the second position to control the pressure within the reservoir chamber and govern fluid flow between the inlet and outlet tubes so as to limit the quantity of fluid in the working circuit and thereby confine the speed of the turbine element to a predetermined maximum.

11. A hydrodynamic drive device comprising driving and driven elements cooperating to define a fluid working circuit therebetween, a fluid inlet and a fluid outlet for the hydrodynamic drive device, and means controlling the speed of the driven element, the controlling means including means sensing the speed of the device, the sensing means being operative to alter fluid flow between the inlet and the outlet in accordance with variations in the speed of one of the elements so as to control the quantity of fluid within the working circuit and accordingly maintain the speed of the driven element substantially constant.

12. A hydrodynamic drive device comprising driving and driven elements cooperating to define the fluid working circuit therebetween, a fluid inlet and a fluid outlet for the hydrodynamic drive device, and means controlling the speed of the driven element, the controlling means including means responsive to a speed sensitive pressure from within the hydrodynamic drive device, the pressure responsive means being automatically operative to alter fluid flow between the inlet and the outlet in accordance with variations in the pressure within the device so as to control the quantity of fluid in the working circuit and accordingly maintain the speed of the driven element substantially constant.

13. A hydrodynamic drive device comprising driving and driven elements cooperating to define a fluid working circuit therebetween, a reservoir chamber rotatable with one of the elements, a fluid inlet and a fluid outlet for the hydrodynamic drive device both positioned within the reservoir chamber, and means limiting the speed of the driven element to a predetermined maximum, the limiting means including means responsive to a speed sensitive pressure from within the reservoir chamber, the pressure responsive means being automatically operative to control the fluid flow between the inlet and the outlet in accordance with variations in the speed sensitive pressure within the chamber so as to control the quantity of fluid in the working circuit and accordingly limit the speed of the driven element to said predetermined maximum.

14. A hydrodynamic drive device comprising driving and driven elements cooperating to define a fluid working circuit therebetween, a reservoir chamber rotatable with one of the elements, a fluid inlet and fluid outlet for the hydrodynamic drive device both positioned within the reservoir chamber, the fluid inlet having the outlet thereof so arranged within the reservoir as to communicate with a speed sensitive pressure therein, a source of fluid pressure connected to the inlet, and means controlling the speed of the driven element, the controlling means including a valve coacting with the fluid inlet so as to be responsive to the speed sensitive pressure within the reservoir chamber, the valve being automatically operative to alter fluid flow through the inlet in accordance with variations in the speed varied pressure within the reservoir chamber so as to control the quantity of fluid within the working circuit and accordingly maintain the speed of the driven element substantially constant.

15. A hydrodynamic drive device comprising driving and driven elements cooperating to define a fluid working circuit therebetween, a reservoir chamber rotatable with one of the elements and so arranged that centrifugal force will cause an annular fluid ring to form within the chamber during operation, a fluid inlet and a fluid outlet for the hydrodynamic drive device both positioned within the reservoir chamber, the fluid inlet having the output thereof so arranged as to communicate with the annular ring, a source of fluid pressure connected to the fluid inlet, a control valve in a first position both interrupting supply of fluid pressure to the inlet and draining fluid pressure from the outlet and in a second position both supplying fluid pressure to the inlet and limiting the draining of fluid pressure from the outlet to a predetermined maximum rate, and means controlling the speed of the driven element, the controlling means including a pressure responsive valve interposed between the control valve and the fluid inlet so as to be sensitive to the pressure of the fluid in the annular ring, the pressure responsive valve being automatically operative, when the control valve is in the second position, to vary fluid flow between the fluid inlet and outlet in accordance with variations in the pressure with the annular ring so as to control the quantity of fluid in the working circuit and accordingly maintain the speed of the driven element relatively constant.

16. A fluid coupling comprising pump and turbine elements cooperating to define a fluid working circuit therebetween, a reservoir chamber rotatable with one of the elements and so arranged that centrifugal force will cause fluid from the working circuit to form an annular fluid ring within the chamber during operation, stationary fluid inlet and outlet ducts positions within the reservoir chamber, the fluid inlet having the outlet thereof so arranged as to communicate with the annular ring, a source of fluid pressure connected to the fluid inlet duct, a control valve in a first position both interrupting supply of fluid pressure to the inlet duct and draining fluid pressure from the outlet duct and in a second position both supplying fluid pressure to the inlet duct and limiting the draining of fluid pressure from the outlet duct to a predetermined maximum rate, and means limiting the speed of the turbine element to a predetermined maximum, the limiting means including a pressure responsive valve interposed between the control valve and the inlet duct so as to be sensitive to the pressure of the fluid in the annular ring, the pressure responsive valve being automatically operative, when the control valve is in the second position, to vary fluid flow between the inlet and outlet ducts so as to control the quantity of fluid within the working circuit and accordingly limit the speed of the turbine element to the predetermined maximum.

17. A hydrodynamic drive device comprising driving and driven elements cooperating to define a fluid working circuit therebetween, a reservoir chamber rotatable with one of the elements and so arranged that centrifugal force will cause fluid from the working circuit to form an annular fluid ring within the chamber during operation, stationary fluid inlet and outlet tubes positioned within the reservoir chamber so as to extend radially outwardly from the rotational axis thereof, the fluid inlet having the output thereof so arranged as to communicate with the annular ring, a source of fluid pressure connected to the fluid inlet tube, and means controlling the speed of the driven element, the controlling means including a valve coacting with the inlet tube so as to be responsive to the pressure within the annular ring, the pressure responsive valve being automatically operative to vary fluid flow through the inlet tube in accordance with variations in the pressure within the chamber so as to control the quantity of fluid within the working circuit and accordingly maintain the speed of the driven element relatively constant.

18. A fluid coupling comprising pump and turbine elements cooperating to define a fluid working circuit therebetween, a reservoir chamber rotatable with one of the elements and so arranged that centrifugal force will cause fluid from the working circuit to form an annular fluid ring within the chamber during operation, stationary fluid inlet and outlet tubes positioned within the reservoir chamber so as to extend radially outwardly from the rotational axis thereof, the fluid inlet having the outlet thereof so arranged as to communicate with the annular ring, a source of fluid pressure connected to the fluid inlet tube, a control valve in a first position both interrupting the supply of fluid pressure to the inlet tube and draining fluid pressure from the output tube and in a second position both supplying fluid pressure to the inlet tube and limiting the draining of fluid pressure from the outlet tube to a predetermined maximum rate, and means limiting the speed of the turbine element to a predetermined maximum, the limiting means including a pressure responsive valve interposed between the control valve and the fluid inlet tube so as to be sensitive to the pressure within the annular ring, the pressure responsive valve being automatically operative, when the control valve is in the second position, to vary fluid through the inlet tube in accordance with variations in the pressure within the annular ring so as to control the quantity of fluid within the working circuit and accordingly limit the speed of the turbine element to the predetermined maximum.

References Cited in the file of this patent

UNITED STATES PATENTS

| | | |
|---|---|---|
| 2,074,346 | Sinclair | Mar. 23, 1937 |
| 2,281,077 | Pollard | Apr. 28, 1942 |
| 2,352,109 | Leary | June 20, 1944 |
| 2,645,137 | Roche | July 14, 1953 |
| 2,761,276 | Kollman | Sept. 4, 1956 |
| 2,845,817 | Polomski | Aug. 5, 1958 |

UNITED STATES PATENT OFFICE
CERTIFICATE OF CORRECTION

Patent No. 2,983,164                                May 9, 1961

Walter B. Herndon et al.

It is hereby certified that error appears in the above numbered patent requiring correction and that the said Letters Patent should read as corrected below.

Column 9, line 48, for "positions" read -- positioned --; column 10, line 49, after "fluid" insert -- flow --.

Signed and sealed this 7th day of November 1961.

(SEAL)
Attest:

ERNEST W. SWIDER                               DAVID L. LADD
Attesting Officer                                  Commissioner of Patents

USCOMM-DC